Aug. 11, 1964  C. P. CARTER  3,144,058
CHIP PRODUCING SAW
Filed March 10, 1961
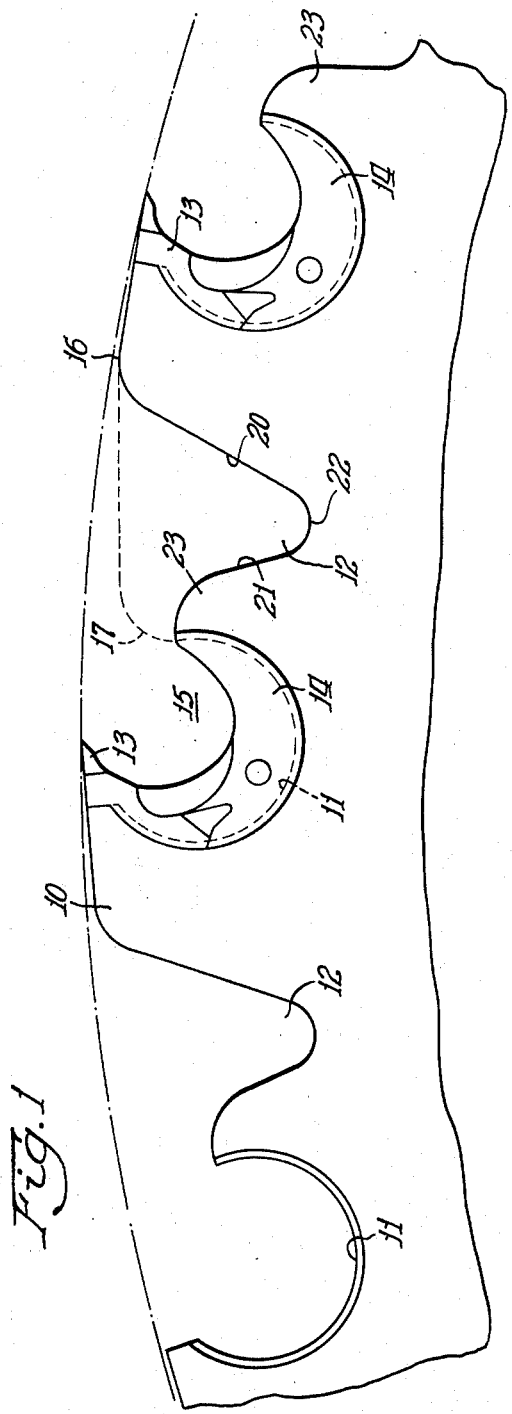
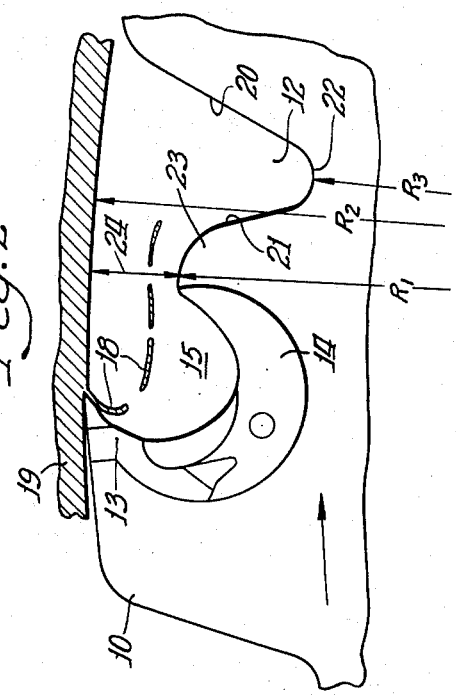
Inventor:
Cecil P. Carter
By: Frank R. Thuerport
Atty.

United States Patent Office 3,144,058
Patented Aug. 11, 1964

3,144,058
CHIP PRODUCING SAW
Cecil P. Carter, Ocala, Fla., assignor to Borg-Warner Corporation, Chicago, Ill., a corporation of Illinois
Filed Mar. 10, 1961, Ser. No. 94,746
3 Claims. (Cl. 143—133)

This invention relates to circular saw blades and in particular to an improvement for controlling the size and quality of kerf chips produced by the saw.

As is well known, pulp wood is used in the manufacture of paper. The source of the pulp wood are pieces of wood of different types and different sizes. Recently lumber manufacturers have learned that the cuttings produced in the lumber mills are a merchantable product, the value depending upon the quality of the cutting produced. They have found, in particular, that the chips produced when lumber is cut has certain value especially if the size of the chips can be controlled. In other words, these lumber manufacturers have found that merchantable pulp wood chips can be produced instead of waste saw dust. Obviously, this by-product can produce considerable additional revenue for the lumber manufacturers.

Not unexpectedly, the lumber manufacturers have had their problems in producing a merchantable pulp wood chip for the pulp wood industry. With the inception of any new idea, there necessarily are differences of opinion and kerf chip manufacture is no exception. It is commonly recognized, however, that kerf chip quality is affected by a number of factors such as the diameter of the saw, the rate at which lumber is fed into the saw, the number and spacing of the saw teeth and the speed at which the saw is turned.

One of the problems involved in trying to coordinate all of these variables to arrive at a good quality kerf chip is a clogging of the chips in the kerf in the gullet between adjacent teeth.

Accordingly, one of the objects of this invention is to produce an improved circular saw which is capable of producing a high quality merchantable kerf chip.

A further object is to construct a circular saw blade which has a wide spacing between the teeth and an extra gullet section between the teeth to provide storage space for the kerf chips as they are cut from the wood and while that portion of the saw is still traveling in the kerf.

Further objects of this invention will appear as the description proceeds, when read in connection with the accompanying drawings.

FIG. 1 is a fragmental section showing a portion of a circular saw blade;

FIG. 2 is a view similar to FIG. 1 showing the saw in operation and diagrammatically illustrating the path of the chips and how they proceed into the extra gullet space.

Referring more particularly to the drawings, 10 indicates a portion of the peripheral region of a circular saw having peripherally spaced sockets 11 and peripherally spaced gullets 12 formed therein. In the illustration I have chosen to show a saw of the inserted tooth type such as shown, for example, in the U.S. patent to Chapin 2,609,017 or the U.S. patent to Lawson 2,694,423. A tooth 13 is fitted into the socket 11 by means of a holder 14 so as to define a gullet 15.

In the prior art the peripheral structure between adjacent teeth would be a solid section as is noted by a dotted line extending from the upper portion 16 of one tooth to the leading side 17 of the next adjacent socket. See, for example, the U.S. patent to Chapin 2,609,017. I have found that if an extra gullet 12 is provided between adjacent teeth, it will provide extra storage space for the wood chips 18 as they are sliced from the material 19 as shown in FIG. 2. This extra gullet 12 prevents a clogging of the chips in the gullet 15.

In one particular construction, as illustrated in FIG. 1, I have found that the gullet may be formed by cutting the saw blade radially inwardly along the lines 20 and 21 to meet with a filleted portion 22. Thus the line 21 in conjunction with the edge of the tooth holder 14 defines a substantially radially outwardly extending projection 23. The outermost portion of projection 23 is shown at radius $R_1$. Thus the open space between the saw radius $R_2$ and $R_1$ defines an opening or access means 24 as shown in FIG. 2 which permits the chips 19 to flow from gullet 15 to gullet 12 when the saw is rotated in the clockwise direction indicated by the arrow. The filleted portion 22 may be positioned inwardly from the periphery a distance of $R_2$–$R_3$, i.e., a distance approximately equal to the depth of the deepest portion of socket 11.

One of the saws that I have used successfully in producing high quality wood chips is 52 inches in diameter, has 26 teeth spaced equally around the periphery and has an extra gullet 12 formed between each of the adjacent teeth as illustrated in FIG. 1. This saw was operated at a feed per tooth of ⅜ inch in order to make chips of ⅜ inch long wood fibers. This saw was used at 800 r.p.m. thus giving a feed of 650 feet per minute or 7800 inches per minute.

While a preferred embodiment of the invention has been specifically disclosed, it is understood that the invention is not limited thereto as other variations will be readily apparent to those skilled in the art and the invention is to be given its fullest possible interpretation within the terms of the following claims.

I claim:

1. A circular saw comprising a plurality of cutting teeth, means defining a plurality of first gullets formed immediately adjacent to and associated with each of said cutting teeth, means defining a plurality of second gullets formed between said first gullet means and the next adjacent cutting tooth, said second gullet means defining chip storage space to prevent clogging of chips in a kerf, and a non-cutting projection means between each of said first and second gullet means extending radially outward not more than substantially three-fifths the depth of the second gullet and terminating a substantial distance short of the periphery of the saw blade to form a separation between said first and second gullet means and defining an access between said first and second gullet means when the saw is engaged in cutting.

2. A circular saw of the inserted tooth type comprising a plurality of cutting teeth, means defining a plurality of first gullets formed immediately adjacent to and associated with each of said cutting teeth, means defining a plurality of second gullets formed between each of said first gullet means and the next adjacent cutting tooth, said second gullet means being adapted to receive chips from a saw kerf, and means defining an access for chips to be conveyed from said first gullet means to said second gullet means, said last named means comprising a substantially radially outwardly extending non-cutting projection on the peripheral portion of said saw extending radially outward not more than substantially three-fifths the depth of the second gullet and terminating a substantial distance short of the periphery of the saw blade to define a substantial opening between the outermost part of said projection and the periphery of the saw.

3. A circular saw of the inserted tooth type comprising a plurality of cutting teeth, means defining a plurality of first gullets formed immediately adjacent to and associated with each of said cutting teeth, and means defining a plurality of second gullets formed between each of said first gullet means and the next adjacent cutting tooth, said second gullet means being adapted to receive chips from a saw kerf, said first and second gullet means being defined in part by substantially radially outwardly extending non-cutting projections formed on the periphery of said saw between said first and second gullet means, said projection terminating a substantial distance short of the periphery of said saw to thereby define a substantial opening between the radially outermost portion of said projection and the bottom of a saw kerf when the saw is engaged in cutting, said opening then defining a path for the flow of chips from said first gullet to said second gullet.

References Cited in the file of this patent
UNITED STATES PATENTS

| | | |
|---|---|---|
| 505,154 | Bowles | Sept. 19, 1893 |
| 564,582 | Barber | July 28, 1896 |
| 1,672,893 | Kurtz | June 12, 1928 |